United States Patent
Harvey et al.

[11] 3,734,612
[45] May 22, 1973

[54] NUMBER ON PRINT OPTICAL APPARATUS

[75] Inventors: James E. Harvey; Oliver W. Gnage, both of Rochester, N.Y.

[73] Assignee: Eastman Kodak Company, Rochester, N.Y.

[22] Filed: Aug. 11, 1971

[21] Appl. No.: 170,855

[52] U.S. Cl. ......................................355/40, 95/1.1
[51] Int. Cl. ........................G03b 27/32, G03b 17/24
[58] Field of Search ..........................355/40; 95/1.1

[56] References Cited
UNITED STATES PATENTS

| | | |
|---|---|---|
| 3,216,317 | 11/1965 | Nail.........................................355/65 |
| 3,142,235 | 7/1964 | Siegmund................................95/11 |
| 2,911,884 | 11/1959 | Caudle....................................353/77 |
| 3,263,555 | 8/1966 | Scheib.....................................355/43 |

*Primary Examiner*—John M. Horan
*Attorney*—W. H. J. Kline et al.

[57] ABSTRACT

Optical print apparatus for use with film having individual frame numbers exposed for each camera exposure. During printing from the negative a secondary optical system intercepts the frame number, magnifies it and projects it for printing on the edge of the print paper.

3 Claims, 4 Drawing Figures

PATENTED MAY 22 1973

JAMES E. HARVEY
OLIVER W. GNAGE
INVENTORS

BY C.A.Krenzer
W.W.J.Kline
ATTORNEYS

PATENTED MAY 22 1973 3,734,612

JAMES E. HARVEY
OLIVER W. GNAGE
INVENTORS

BY C. A. Krenzer

J. W. J. Kline
ATTORNEYS

NUMBER ON PRINT OPTICAL APPARATUS

BACKGROUND OF THE INVENTION

1. Field of the Invention

This invention relates to optical photographic printing apparatus and more particularly to photographic printing apparatus capable of printing frame number indicia on the edge of the photographic print.

2. Description of the Prior Art

In the course of collating the negatives from small format photography with the prints made therefrom, it is often difficult to recognize the correct set out of, for example, many similar scenes. This capability is especially important to the customer who may want to make or order additional prints of a particular photograph or in the case of a commercial printing operation where it is determined that a particular negative must be reprinted.

There are in existence systems which use counters and printers, appropriately synchronized, to edge mark the photographic print, but these are somewhat complex and do induce the possibility of operator error in the print cycle. Such systems also require number-free advance for blank or unprinted frames to maintain the correct sequence.

There are films which have individual frame numbers pre-exposed for each camera exposure and it would be desirable to print this indicia on the edge of the photograph in small size. However, since most projection printing systems (especially for small film formats) are at considerably magnification, the normal printer lens could not be used to accomplish this purpose. The problem is further complicated by the fact that the pre-exposed frame number on the film is not in the proper position for direct projection onto the photographic print paper.

OBJECTS AND SUMMARY OF THE INVENTION

Accordingly it is a principle object of this invention to provide an improved photographic projection printing system having the capability of providing a frame number on the print which overcomes the disadvantages of the prior art.

Another object of the invention is to provide such a photographic projection printing system which automatically prints the frame number at the time of the printing of the photograph.

A further object of the invention is to provide a system for edge printing of the frame number which properly orients and magnifies the frame number on the photographic print.

Still another object of the invention is to provide an edge printing negative frame number on the edge of a photographic print which does not require any special action on the part of the operator.

According to one aspect of the invention, a processed film which has individual, pre-exposed frame numbers adjacent each camera exposure frame is located in a negative plane. A printing lens is placed between the film and the print plane containing the print material, the printing lens providing the desired magnification to yield the selected print size. Interspersed between the print lens and the print plane is a secondary optical projection system oriented to intercept the projected frame number, suitably magnify it and redirect it toward the edge of the photographic print and the desired location. This is done, for example, by placing a collecting lens on the print plane side of the printing lens and focusing its output on the end of an image conduit, such as a coherent fiber optic bundle, which is twisted and oriented so that the other end of the bundle is adjacent the desired edge of the photographic print paper.

DESCRIPTION OF THE PREFERRED EMBODIMENT

Figure 1:
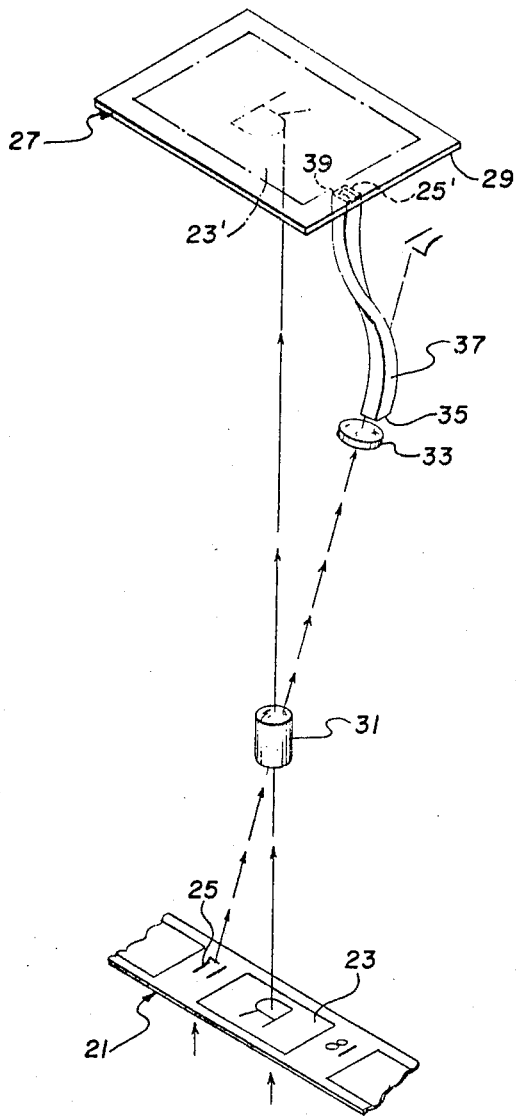
FIG. 1 is a diagrammatic representation of an optical printing system using a fiber optic bundle as a transmission medium in a secondary optical system according to the present invention.
Figure 2:
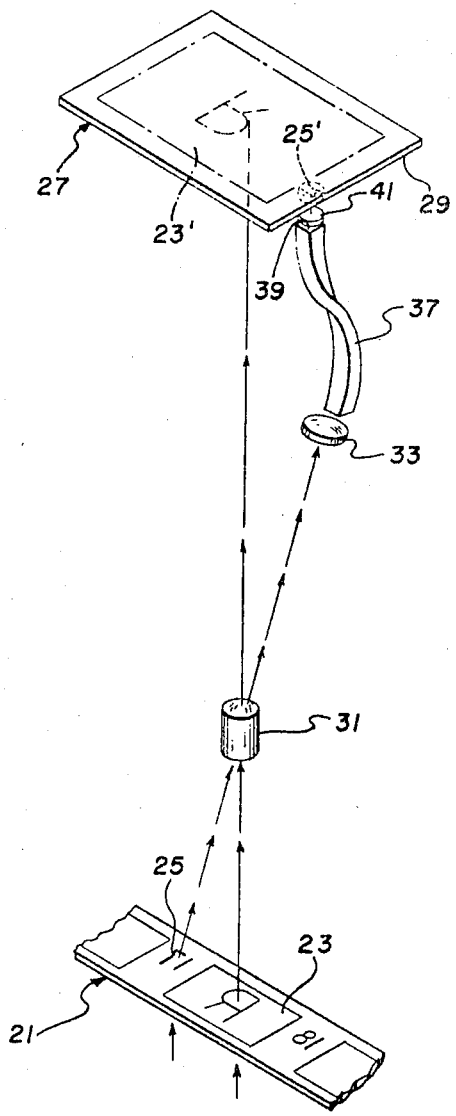
FIG. 2 is a diagrammatic representation of an alternate embodiment of the invention of FIG. 1.

Referring first to FIG. 1 the system shown in diagrammatic form includes a portion 21 of a strip of film negatives such as the inverse R 23 adjacent to which is the corresponding frame number 25. Disposed above the film strip 21 is the photographic print material 27 with its emulsion side 29 facing the negative material. Positioned between the photographic print material 27 and the strip of negative 21 is the printing lens 31 which acts to magnify the image 23 to provide an enlarged image 23' upon the emulsion on the paper print material 27. The frame identifying number 25 (in the case the numeral 17) projects through the printing lens 31 and is intercepted by a collecting lens 33 which projects the image on one end 35 of a fiber optic bundle 37. The other end 39 of the fiber optic bundle is positioned proximate the edge of the print material 27, facing the emulsion side 23 of the photographic print material. As can be seen in FIG. 1, the fiber optic bundle 37 may be appropriately twisted or bent to provide a desired orientation and registration of the frame number 25 on the print material 27. Also, as can be seen from this drawing, whereas the original image 23 is projected to an enlarged print 23', the print of the frame identifying number 25' has approximately unity magnification. Depending on the placement of the lens 33 with respect to the printing lens 31 and the film negative material 21, the magnification factor for the frame identifying number 25 can be varied independently of the magnification of the image 23. With the system as shown in FIG. 1, the exit end 39 of the fiber optics bundle 37 must be almost in contact with the print material 27. Typically a maximum allowable spacing would be 0.01 inches. Greater spacing between the exit end 39 of the fiber optics bundle and the photographic print material 27 can be achieved as shown in FIG. 2, wherein a relay lens 41 is positioned between the exit end 39 of the fiber optics bundle and the image print area of the photograph material 27. In a typical case this lens system might have a unity magnification factor and would allow a greater variation, e.g. 0.03 inches, in the spacing of the paper print material. In addition, the increased spacing between the lens 41 and paper 27 allows for the removal of a paper mask (not shown) without disturbing the optical system.

Figure 3:
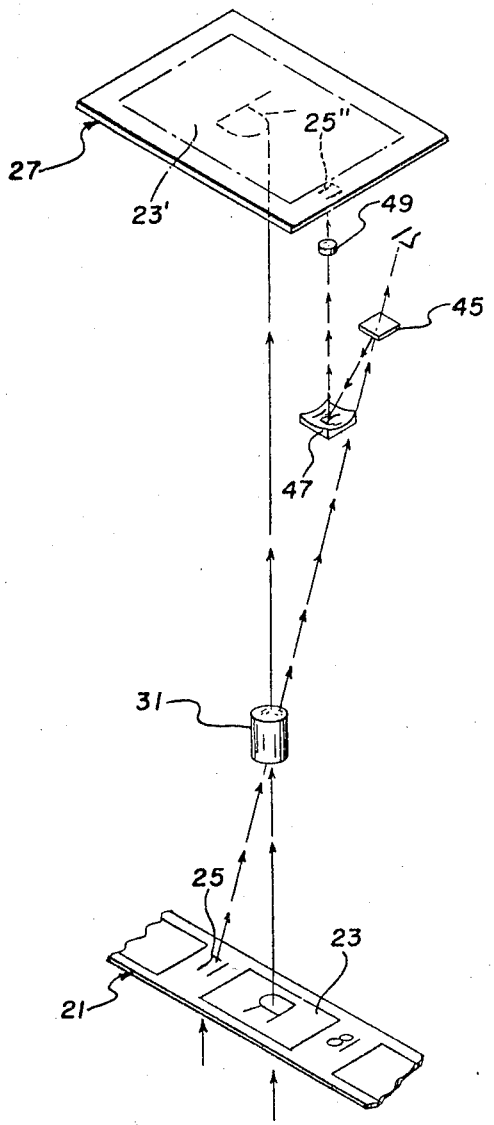
FIG. 3 is a diagrammatic representation of an optical printing system according to the present invention utilizing lenses and mirrors in the secondary projection system.
Figure 4:
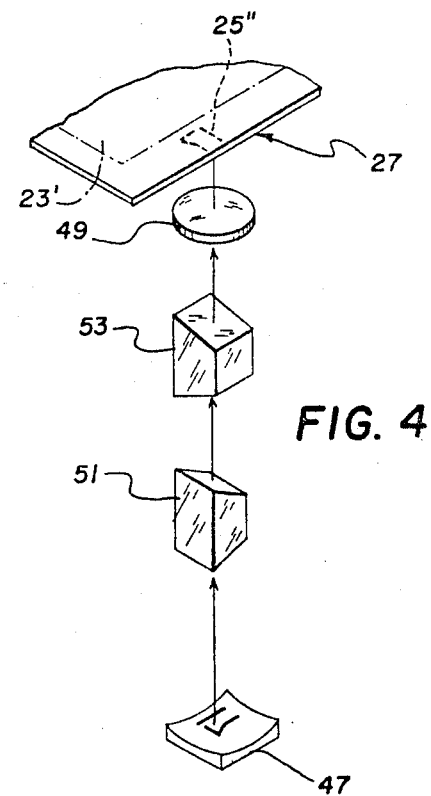
FIG. 4 is a diagrammatic representation of a pair of inversion prisms which may be used with the system of FIG. 3.

Referring next to FIG. 3, therein is shown a system similar to that shown in FIG. 1 except that the fiber optics bundle has been replaced by a mirror/lens system. In this embodiment, the film frame image is projected through the printing lens 31 and is intercepted by a reflecting mirror 45 which directs the image toward a concave mirror 47. The image is in turn reflected from the mirror 47 through a lens 49 to the image position 25'' on the underside of the photographic print material 27. The lens 49 is selected to have a suitable magnification to provide the desired size of the image 25'' of the frame number. The system of FIG. 3 does not permit a reorientation of the image 25'' of a frame number. However this capability can be easily added thereto by using a modification as illustrated in FIG. 4, which consists of first and second inversion prisms 51 and 53, respectively. If this pair of prisms is inserted between the concave mirror 47 and the lens 49 of FIG. 3, there will be provided the capability to rotate and orient the image as it is projected onto the underside of the photograph print material 27. For example, one prism 51 may be held stationary to alter the number for "handedness" and the second prism 53 rotated to have the number properly oriented with respect to the print picture image.

While the invention has been shown and described in what are presently considered to be the preferred embodiments thereof, it will be readily apparent to those skilled in the art that various modifications and changes may be made herein without departing from the scope of the invention. For example as illustrated in the foregoing description, the exposure time for the frame number image 25' would be the same as the exposure time for the print image 23'. However, it would be possible to interpose a shutter between the printing lens 31 and the image 25' to vary the amount of exposure given to a frame identifying number. This might be desirable if the frame identifying numbers on the film 21 all had the same relative exposure, whereas the scenes 23 on the film might vary. In this case the exposure time for the frame identifying number 25 could be held constant, but would always be less than or equal to the exposure time for the scene 23.

The invention as been described in detail with particular reference to preferred embodiments thereof, but it will be understood that variations and modifications can be effected within the spirit and scope of the invention.

We claim:

1. In photographic printing apparatus for film having an individual film frame number adjacent each film frame and which apparatus includes a film holder, a print plane, a printing lens positioned therebetween and means for selectively exposing a film frame in said holder for projection of an image thereof through said lens onto a predetermined area of said print plane, the improvement comprising:

secondary optical projection means, positioned between said printing lens and the print plane, for intercepting the projection of a film frame number from said printing lens and projecting it to an edge of said predetermined area in the print plane at a desired orientation relative to the projection of a film frame and at a lower factor of magnification therefrom;

said second optical projection means comprising a coherent fiber optic bundle having its first end adjacent said edge of said predetermined area of said print plane and its second end facing said printing lens, a collecting lens positioned between said printing lens and the second end of said fiber optic bundle, and a relay lens positioned between the first end of said fiber optic bundle and said edge of said predetermined area of said print plane.

2. The invention according to claim 1 wherein said fiber optic bundle is twisted along a longitudinal axis to provide a desired orientation of a frame number as it is projected on the edge of said print plane.

3. In photographic printing apparatus for film having an individual film frame number adjacent each film frame and which apparatus includes a film holder, a print plane, a printing lens positioned therebetween and means for selectively exposing a film frame in said holder for projection of an image thereof through said lens onto a predetermined area of said print plane, the improvement comprising:

secondary optical projection means, positioned between said printing lens and the print plane, for intercepting the projection of a film frame number from said printing lens and projecting it to an edge of said predetermined area in the print plane at a desired orientation relative to the projection of a film frame and at a lower factor of magnification therefrom;

said second optical projection means comprising first and second reflecting mirrors positioned between said printing lens and said printing plane such that said first mirror intercepts said frame number and directs it toward said second mirror and said second mirror directs it toward the desired edge of said predetermined area of said print plane, and an imaging lens positioned between said second mirror and said edge of said predetermined area of said print plane to image said frame number thereon, and first and second inversion prisms positioned between said second mirror and said imaging lens, said first and second inversion prisms being adjusted to establish the desired orientation of said frame number on said edge of said predetermined area of said print plane.

* * * * *